May 1, 1934.  J. A. BALL ET AL  1,957,128
VIEW FINDER SYSTEM
Filed Aug. 20, 1931
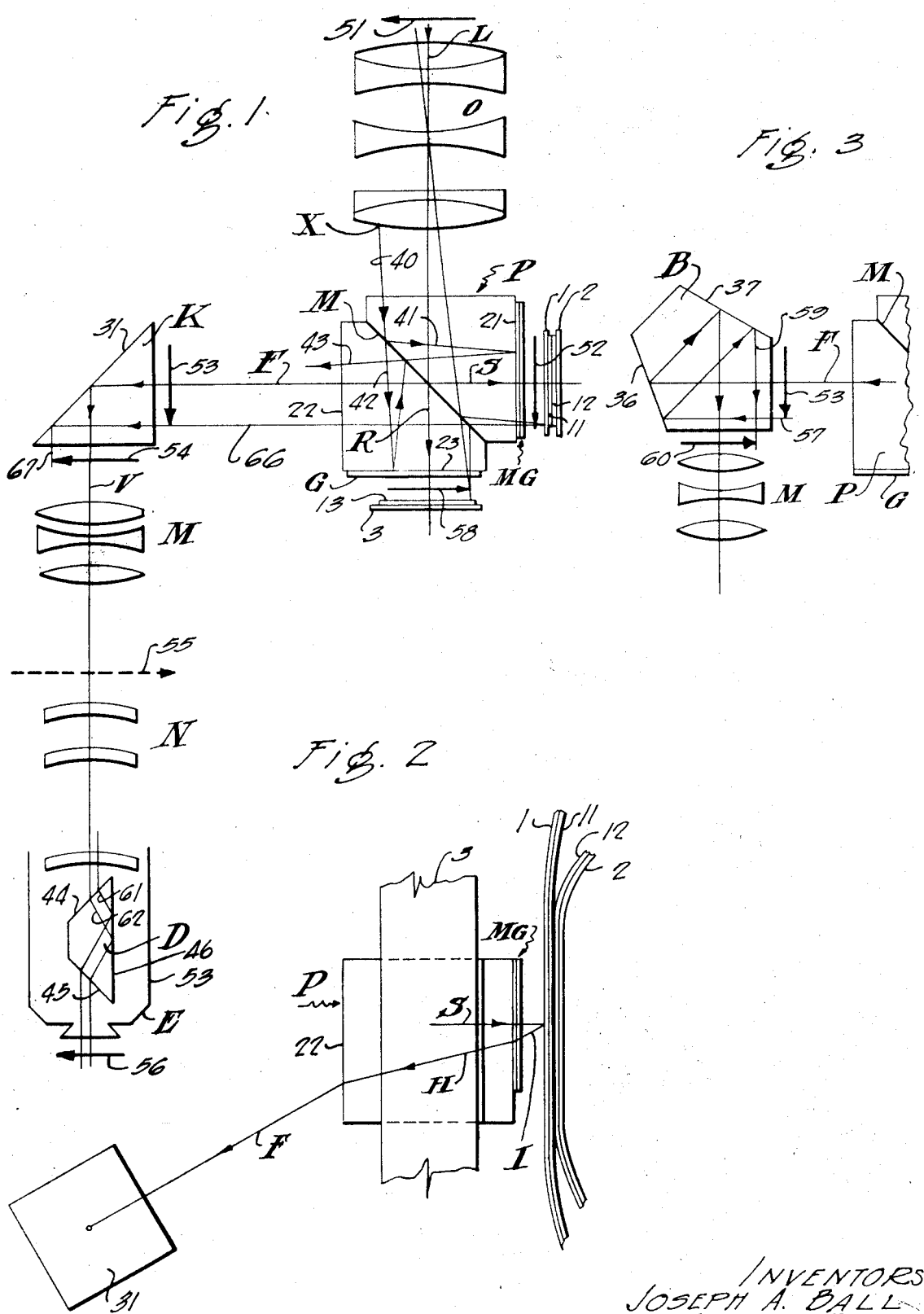
INVENTORS
JOSEPH A. BALL
GERALD FRANKLIN RACKETT Patented May 1, 1934

1,957,128

UNITED STATES PATENT OFFICE 1,957,128

VIEW FINDER SYSTEM

Joseph A. Ball and Gerald Franklin Rackett, Los Angeles, Calif., assignors, by mesne assignments, to Technicolor, Inc., New York, N. Y., a corporation of Delaware Application August 20, 1931, Serial No. 558,194

5 Claims. (Cl. 88—1)

This invention relates to cameras for taking photographic pictures in natural colors which employ light-dividing units as, for example, described in Patent #1,889,030, issued Nov. 29, 1932 to Joseph A. Ball. In its main aspect, the invention contemplates the utilization of certain properties of the aforementioned light-dividing unit for purposes of combining it with simple optical elements to form a view finder which is particularly suited for purposes of color photography, especially color cinematography. Its main object is a view finder arrangement which enables the operator not merely to see a more or less accurate reduced view of the object field to be photographed, but to see the images as they are actually recorded on the photographic emulsions of the color separation camera. Other objects are to provide a view finder for color separation cameras which permits the viewing of the images produced by the main optical system of the camera, to avoid detrimental effects due to reflections of the taking lens system in the light-dividing system, to permit observation of the images of the object field in the exact frame as photographed and in colors of substantially the same values as actually recorded, and to provide a view finder of this kind which permits the operator to look into the view finder from the back of the camera. These and additional objects will be apparent from the following explanation illustrating the genus of the invention by reference to two concrete embodiments. The description refers to a drawing in which:

Fig. 1 is a diagrammatic view of one embodiment of the invention;

Fig. 2 is a front elevation of the same embodiment with the lens system omitted; and Fig. 3 is a diagrammatic view corresponding to Fig. 1, of another embodiment of the invention, illustrated in so far as it varies from Fig. 1.

Referring to Figs. 1 and 2, the principal optical elements of a camera for taking color separation negatives with substantially identical optical axes, as used in the embodiment herein described, are a suitable objective lens system O and a light-dividing prism system P with a partially transparent reflector M for dividing the incident light beam L into a direct component beam R and a reflected component beam S. After passing appropriate filters G and MG the light beams record their respective images on emulsions 11, 12, 13 supported on suitable bases 1, 2, 3 in the apertures of film gates. In the present embodiment a pair of emulsions and a single emulsion are shown in the paths of the component beams respectively, in accordance with one modification of the invention as described and claimed in the above identified patent of Joseph A. Ball, but it is understood that any desired number of light sensitive elements may be employed and also that the present invention is not limited to this particular form of the light splitting system nor to color cinematography.

The face 22 of prism unit P is not obstructed by any elements of the system and through this face both film apertures of the camera can be observed, the aperture with two films directly and the aperture with one film as reflected by the semi-transparent mirror M. It is therefore possible to observe through face 22 an image which is additionally recomposed from the aperture images through the taking filters and appears therefore substantially in the same color values in which it will be finally reproduced, thus enabling the camera operator to judge color values, exposure, focus, etc., to advantage. This can be accomplished by looking directly towards face 22, for instance with a small viewing telescope, but in order to make the view better accessible, a reflecting element, as for example the prism K with reflecting surface 31 (Fig. 1), is arranged opposite face 22 at an inclination of approximately 45° thereto. This prism reflects the image into the direction of the main optical axis, namely that of the objective lens system O as indicated by ray V. It is then conveniently enlarged by any suitable telescopic means such as positive system M and negative system N. The positions of the images at the various parts of the system are indicated by arrows 51, 52, 53, 54, 55, 56, 58 which are, however, not drawn exactly in the image planes nor in their correct sizes. The object field 51 is reversed by the objective which in cooperation with the partially reflecting surface M produces the two images 52 and 58; 52 is viewed directly and 58 indirectly, in position 53 which is reversed by reflector 31 into position 54, as indicated by rays 66 and 67. 54 is again laterally reversed by the telescope which creats a virtual image 55. Image 55 is correct in the vertical dimension since the two image reversing systems O and M produce together an erect image of the object field, the reflector planes being vertical and therefore not affecting the verticals of the images. In order to obtain a correct view of the object field, image 55 is laterally reversed by means of a rhomboid prism D (sometimes called Dove prism) which comprises two refracting surfaces 44 and 45, and a reflecting surface 46 which together reverse one dimension of the image, as indicated by rays 61 and 62. The eye-piece E of the view finder is suitably located at the back wall of the camera opposite the taking system, which enables the operator standing at the rear of the camera to look directly at the films in the apertures, which is very helpful in lining up the camera before taking a scene to get side lines, heights, etc., in addition to the possibility of observing the optical characteristics as described above. The Dove prism has an additional function which will be explained hereinafter.

Any point X of the lens system emits rays like ray 40 which is reflected at M as 41 and reflected back towards face 22 as ray 43. Likewise, ray 40 passes as 42 to surface 23 and is reflected as indicated. For this reason, an image of the lens system is seen in the finder if surface 31 is placed directly in front of face 22. In order to eliminate from the finder image this reflected lens system image the finder mirror is preferably raised above the optical axis of the taking system as shown in Fig. 2, so that it faces downwardly toward the aperture images at an angle. The necessary elevation of surface 31 is reduced by the double refraction of the finder beam as indicated in Fig. 2 showing the twice refracted ray F—H—I. The rotation of the image resulting from the fact that the optical axis of the finder system is raised above the aperture axis of the objective lens system can be corrected by slightly rotating the Dove prism, thereby carrying the image around with the prism.

Instead of using a Dove prism for laterally reversing the view finder image, a so-called penta prism can be used in the place of the prism K of Fig. 1. This modification is shown in Fig. 3 where B is a penta prism of the well-known construction, with reflecting faces 36 and 37. Rays 57 and 59 indicate how the image 53 is reversed into position 60, so that an additional reversing device in the finder eye-piece becomes unnecessary.

It should be understood that the present disclosure is for the purpose of illustration only and that this invention includes all modifications and equivalents which fall within the scope of the appended claims.

We claim:

1. An optical system for concomitantly forming images of a scene in different planes comprising a partial reflecting surface for dividing the light incident thereto from the front, reflecting a portion of the light to one plane and transmitting a portion of the light to the other plane, and a finder directed toward the back of said surface for concomitantly viewing said images in register, one of said images being viewed through the surface and the other by reflection from the back of the surface.

2. An optical system for concomitantly forming images of a scene in different planes comprising a partial reflecting surface for dividing a light beam incident thereto from the front, reflecting a portion of the light to one plane and transmitting a portion of the light to the other plane in the direction of said incident beam, and a finder directed toward the back of said surface for concomitantly viewing said images in register, one of said images being viewed through the surface and the other by reflection from the back of the surface, the optical axis of the finder being inclined relative to the back of the partial reflector at an angle different from the angle of incidence of said direction with the front of the partial reflector, to avoid reflection of a lens ghost to the finder.

3. An optical system for concomitantly forming images of a scene in different planes comprising a partial reflecting surface for dividing a light beam incident thereto from the front, reflecting a portion of the light to one plane and transmitting a portion of the light to the other plane in the direction of said incident beam, a finder directed toward the back of said surface for concomitantly viewing said images in register, one of said images being viewed through the surface and the other by reflection from the back of the surface, the optical axis of the finder being inclined relative to the back of the partial reflector, at an angle different from the angle of incidence of said direction with the front of the partial reflector, to avoid reflection of a lens ghost to the finder, and means for counteracting the image rotation produced by the aforesaid difference in angles.

4. An optical system for concomitantly forming images of a scene in different planes comprising a prism set having an interior partial reflecting surface for dividing the light incident thereto from the front, reflecting a portion of the light to one plane and transmitting a portion of the light to the other plane, and a finder for concomitantly viewing said images in register, the finder being directed toward the back of said surface so that one of said images is viewed through the surface and the other by reflection from the back of the surface, said surface bisecting the angle between the two faces of the prism set through which the light enters from the object field and through which light passes to the view finder respectively.

5. An optical system for concomitantly forming images of a scene in different planes comprising a prism set having an interior partial reflecting surface for dividing the light incident thereto from the front, reflecting a portion of the light to one plane and transmitting a portion of the light to the other plane, and a finder for concomitantly viewing said images in register, the finder being directed toward the back of said surface so that one of said images is viewed through the surface and the other by reflection from the back of the surface, said surface bisecting the angle between the two faces of the prism set through which the light enters from the object field and through which light passes to the view finder respectively, and said faces making different angles with the axes of the light beams passing therethrough respectively.

JOSEPH A. BALL.
GERALD FRANKLIN RACKETT.